(12) United States Patent
Takiya et al.

(10) Patent No.: US 12,214,699 B2
(45) Date of Patent: Feb. 4, 2025

(54) VEHICLE SEAT

(71) Applicant: TOYOTA BOSHOKU KABUSHIKI KAISHA, Aichi (JP)

(72) Inventors: Koji Takiya, Aichi (JP); Akihiro Kimura, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 98 days.

(21) Appl. No.: 18/116,085

(22) Filed: Mar. 1, 2023

(65) Prior Publication Data
US 2023/0286418 A1 Sep. 14, 2023

(30) Foreign Application Priority Data
Mar. 9, 2022 (JP) .................................. 2022-036495

(51) Int. Cl.
*B60N 2/02* (2006.01)
*B60N 2/62* (2006.01)
*B60N 2/68* (2006.01)

(52) U.S. Cl.
CPC ............. *B60N 2/0284* (2013.01); *B60N 2/62* (2013.01); *B60N 2/682* (2013.01)

(58) Field of Classification Search
CPC .... B60N 2/0284; B60N 2/0224; B60N 2/062; B60N 2/682; A47C 1/023; A61G 5/1064
USPC ................................................... 297/284.11
See application file for complete search history.

(56) References Cited

U.S. PATENT DOCUMENTS

| | | | | |
|---|---|---|---|---|
| 4,636,002 A | * | 1/1987 | Genjiro | B60N 2/22 297/319 |
| 4,664,444 A | * | 5/1987 | Murphy | A47C 7/029 297/452.53 |
| 4,753,479 A | * | 6/1988 | Hatsutta | B60N 2/1892 297/284.11 |
| 4,915,447 A | * | 4/1990 | Shovar | B60N 2/838 297/284.11 |
| 5,755,488 A | * | 5/1998 | Beda | A47C 1/023 297/DIG. 2 |
| 6,106,063 A | * | 8/2000 | Dauphin | A47C 1/023 297/284.11 |
| 6,659,560 B1 | * | 12/2003 | Chi | A47C 4/028 297/383 |
| 7,874,621 B2 | * | 1/2011 | Gumbrich | B60N 2/0284 297/284.11 |

(Continued)

FOREIGN PATENT DOCUMENTS

| | | | | |
|---|---|---|---|---|
| DE | 102011002127 A1 | * | 12/2011 | B60N 2/0232 |
| JP | 2020-531344 | | 11/2020 | |
| WO | WO-2022029183 A1 | * | 2/2022 | B60N 2/0284 |

*Primary Examiner* — Jose V Chen
(74) *Attorney, Agent, or Firm* — Greenblum & Bernstein, P.L.C.

(57) ABSTRACT

Provided is a vehicle seat having a variable cushion length. The vehicle seat includes: a front panel of metal arranged on a front-end side of a seat cushion to form a frame of the seat cushion; a sliding device allowing a movable portion to be displaceable and including a sliding member of resin displaceable relative to the front panel in seat front-rear directions; and a bracket of metal that is coupled to the front panel in a manner displaceable relative to the front panel in the seat front-rear directions and that is displaced integrally with the sliding member, the bracket transmitting a load acting on the movable portion to the front panel.

6 Claims, 13 Drawing Sheets

(56) References Cited

U.S. PATENT DOCUMENTS

| | | | | |
|---|---|---|---|---|
| 7,909,401 | B2* | 3/2011 | Hofmann | B60N 2/0284 |
| | | | | 297/284.11 |
| 7,997,648 | B2* | 8/2011 | Becker | B60N 2/0284 |
| | | | | 297/284.11 |
| 8,573,696 | B2* | 11/2013 | Kuno | A47C 7/506 |
| | | | | 297/423.34 |
| 2001/0004164 | A1* | 6/2001 | Mattsson | B60N 2/829 |
| | | | | 296/68.1 |
| 2002/0113473 | A1* | 8/2002 | Knaus | A47C 1/023 |
| | | | | 297/284.11 |
| 2006/0033370 | A1* | 2/2006 | Jonas | A61G 5/1054 |
| | | | | 297/284.11 |
| 2013/0257126 | A1* | 10/2013 | Freisleben | B60N 2/0284 |
| | | | | 29/428 |
| 2014/0159451 | A1* | 6/2014 | Mollica | B60N 2/0284 |
| | | | | 297/284.11 |
| 2015/0258914 | A1* | 9/2015 | Lee | B60N 2/62 |
| | | | | 297/284.11 |
| 2016/0137104 | A1* | 5/2016 | Bortolon | B60N 2/99 |
| | | | | 297/284.11 |
| 2016/0144744 | A1* | 5/2016 | Jeong | B60N 2/02246 |
| | | | | 297/283.1 |
| 2016/0339805 | A1* | 11/2016 | Kim | B60N 2/0284 |
| 2018/0126882 | A1* | 5/2018 | Okimura | B60N 2/666 |
| 2020/0198500 | A1 | 6/2020 | Woo et al. | |
| 2022/0063449 | A1* | 3/2022 | Huenink | B60N 2/02246 |
| 2023/0018645 | A1* | 1/2023 | Park | B60N 2/0244 |
| 2023/0129527 | A1* | 4/2023 | Kimbara | B60N 2/5816 |
| | | | | 297/284.1 |

* cited by examiner

VEHICLE SEAT

CROSS-REFERENCE TO RELATED APPLICATIONS

This application claims the benefit of Japanese Patent Application No. 2022-036495 filed on Mar. 9, 2022 with the Japan Patent Office, the entire disclosure of which is incorporated herein by reference.

BACKGROUND

The present disclosure relates to a vehicle seat having a variable cushion length.

For example, in the seat cushion extension device disclosed in Japanese Unexamined Patent Application Publication (Translation of PCT Application) No. 2020-531344 (Patent Document 1), a portion subjected to a load is made of resin. Thus, the vehicle seat with this seat cushion extension device is unable to receive a large load.

SUMMARY

The present disclosure discloses one example of a vehicle seat capable of receiving a larger load.

It is desirable that a vehicle seat including a movable portion at a front-end side of a seat cushion and having a variable cushion length comprises, for example, at least one of the following constituent elements.

Specifically, the constituent elements are: a front panel of metal arranged on the front-end side of the seat cushion to form a frame of the seat cushion; a sliding device allowing the movable portion to be displaceable, the sliding device including a sliding member displaceable relative to the front panel in seat front-rear directions; and a bracket of metal that is coupled to the front panel in a manner displaceable relative to the front panel in the seat front-rear directions and that is displaced integrally with the sliding member, the bracket transmitting a load acting on the movable portion to the front panel.

In the vehicle seat with such a configuration, the load acting on the movable portion is received by the bracket of metal, and the received load is transmitted to the front panel of metal. This enables the vehicle seat to receive a larger load than in the invention disclosed in Patent Document 1.

Further desirable modes of the vehicle seat will be described below as examples.

It is desirable that a shape of an end of the bracket in the seat front-rear directions is substantially U-shape or substantially L-shape.

It is desirable that the bracket includes a standing portion substantially parallel to a vertical direction, and that a vertical dimension of the standing portion on a front-end side thereof is larger than a vertical dimension of the standing portion on a rear-end side thereof.

This results in inhibiting the bracket from interfering with other member when the cushion length is shortened, that is, when the bracket is retracted. Further, in this vehicle seat, such interference with other member can be avoided while securing the flexural rigidity (i.e., the geometrical moment of inertia) required against a vertical load.

It is desirable that a portion of the bracket facing the front panel contains a through hole having an ellipse-like shape extending in a displacement direction of the bracket. It is desirable that a bolt passing through the through hole is fixed to the front panel. It is desirable that a burring portion extending toward the front panel is provided at least to a portion parallel to a major axis direction of the through hole in an outer circumference of the through hole.

This results in increasing the geometrical moment of inertia of the bracket against a vertical load, thus increasing the flexural rigidity of the bracket.

It is desirable that a support portion of resin fixed to the front panel is arranged between the bracket and the front panel, and that the support portion is slidably contactable with the bracket. It is desirable that a portion of the support portion directly facing the bracket includes a groove extending in the displacement direction of the bracket.

This can inhibit a larger contact area between the bracket and the support portion, thus inhibiting a larger sliding resistance between the bracket and the support portions.

It is desirable that a spacer of resin is arranged between a head portion of the bolt and the bracket. This can inhibit a larger sliding resistance between the bracket and the bolt.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
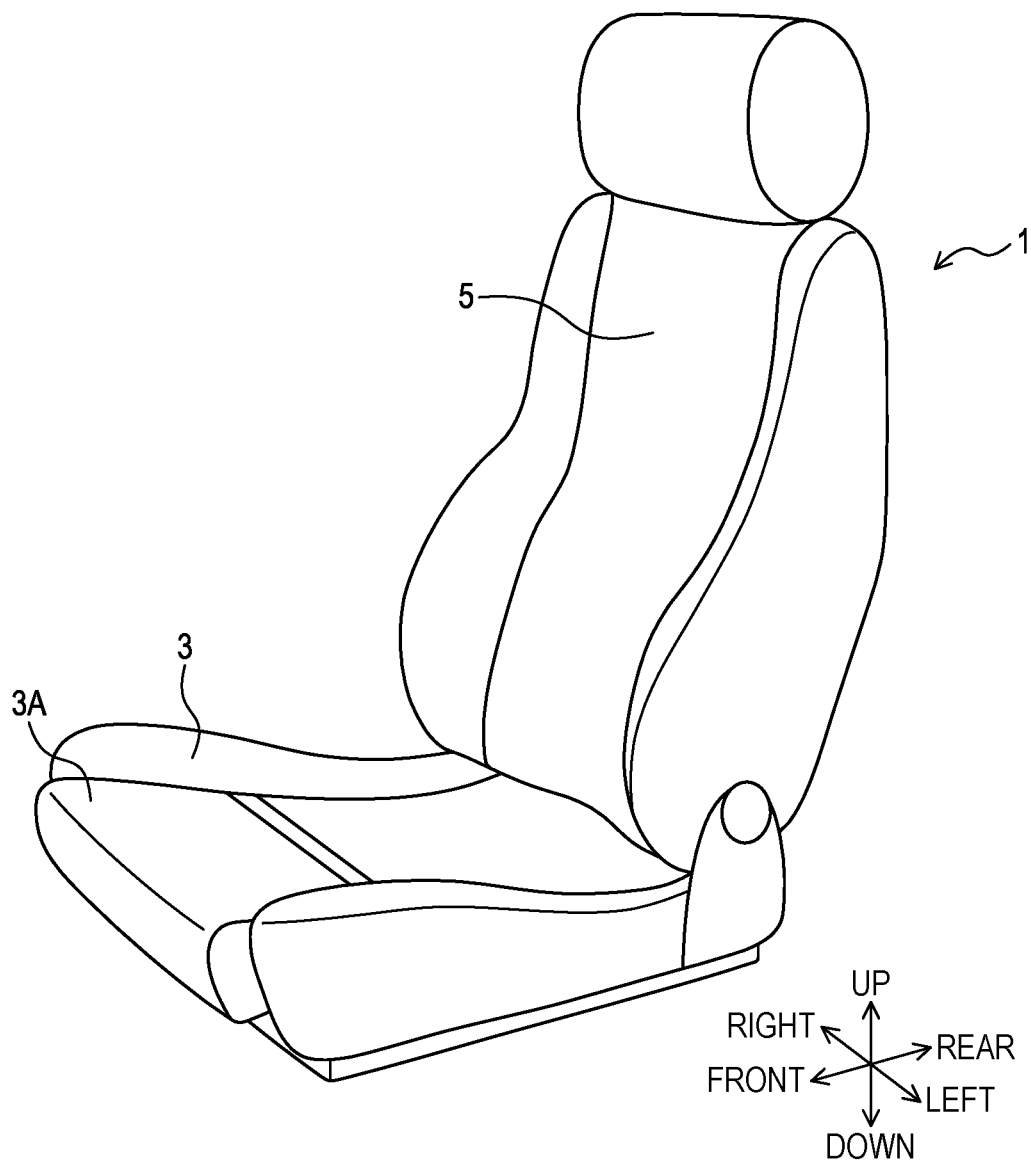
FIG. 1 is a diagram showing a vehicle seat according to a first embodiment.

"Embodiments of the disclosure" below show examples of embodiments falling within the technical scope of the present disclosure. In other words, invention-specifying matters and so on recited in the appended claims are not limited by specific configurations, structures, or the like indicated in the below-described embodiments.

The embodiments below are examples relating to a seat to be mounted in a vehicle such as a car (hereinafter referred to as a vehicle seat). Arrows indicating directions, hatched lines, and so on shown in the drawings are provided for the purpose of easier understanding of mutual relationships between the drawings, shapes of members or portions, and so on.

Thus, the vehicle seat is not limited by the directions shown in the drawings. The directions shown in the drawings are directions in a state where the vehicle seat according to the embodiments below is mounted in the car. The drawings with hatched lines do not necessarily represent sectional views.

A member or portion described at least with a reference numeral is at least one in number except in a case of being accompanied by restrictive words such as "only one". In other words, the member or portion may be two or more in number in a case of not being accompanied by the restrictive words such as "only one". The vehicle seat of the present disclosure comprises elements such as the member or portion described at least with a reference numeral, and structural portions shown in the drawings.

First Embodiment

<1. Overview of Vehicle Seat>

As shown in FIG. 1, a vehicle seat 1 comprises a seat cushion 3 and a seatback 5. The seat cushion 3 supports the occupant's buttocks. The seatback 5 supports the occupant's back.

On a front-end side of the seat cushion 3, a movable portion 3A is provided. The movable portion 3A is displaceable in seat front-rear directions. The occupant can vary the cushion length, that is, the position of the front end of the seat cushion 3, by displacing the movable portion 3A.

Figure 2:
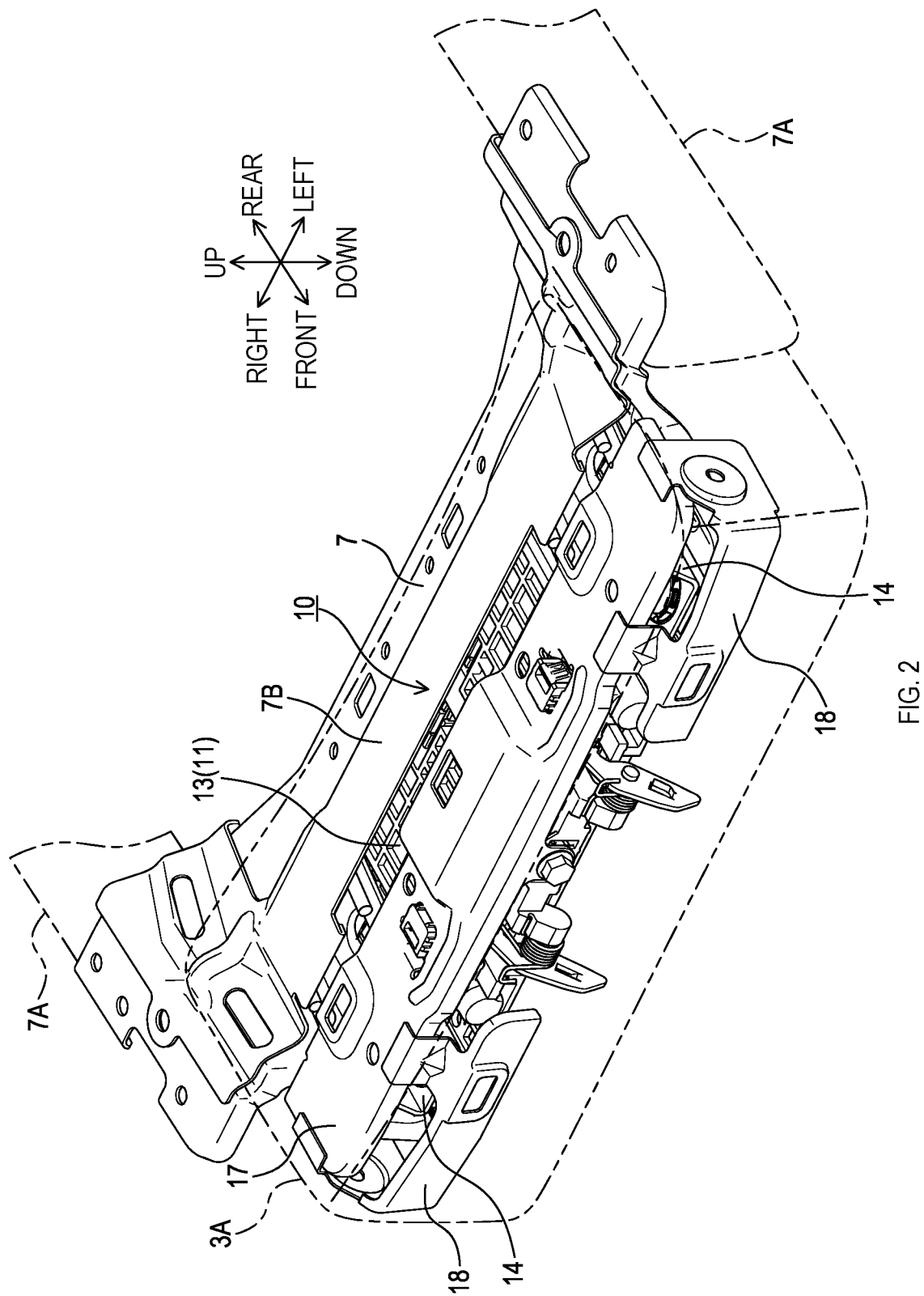
FIG. 2 is a diagram showing a cushion length varying device according to the first embodiment, where the cushion length is smallest.
Figure 3:
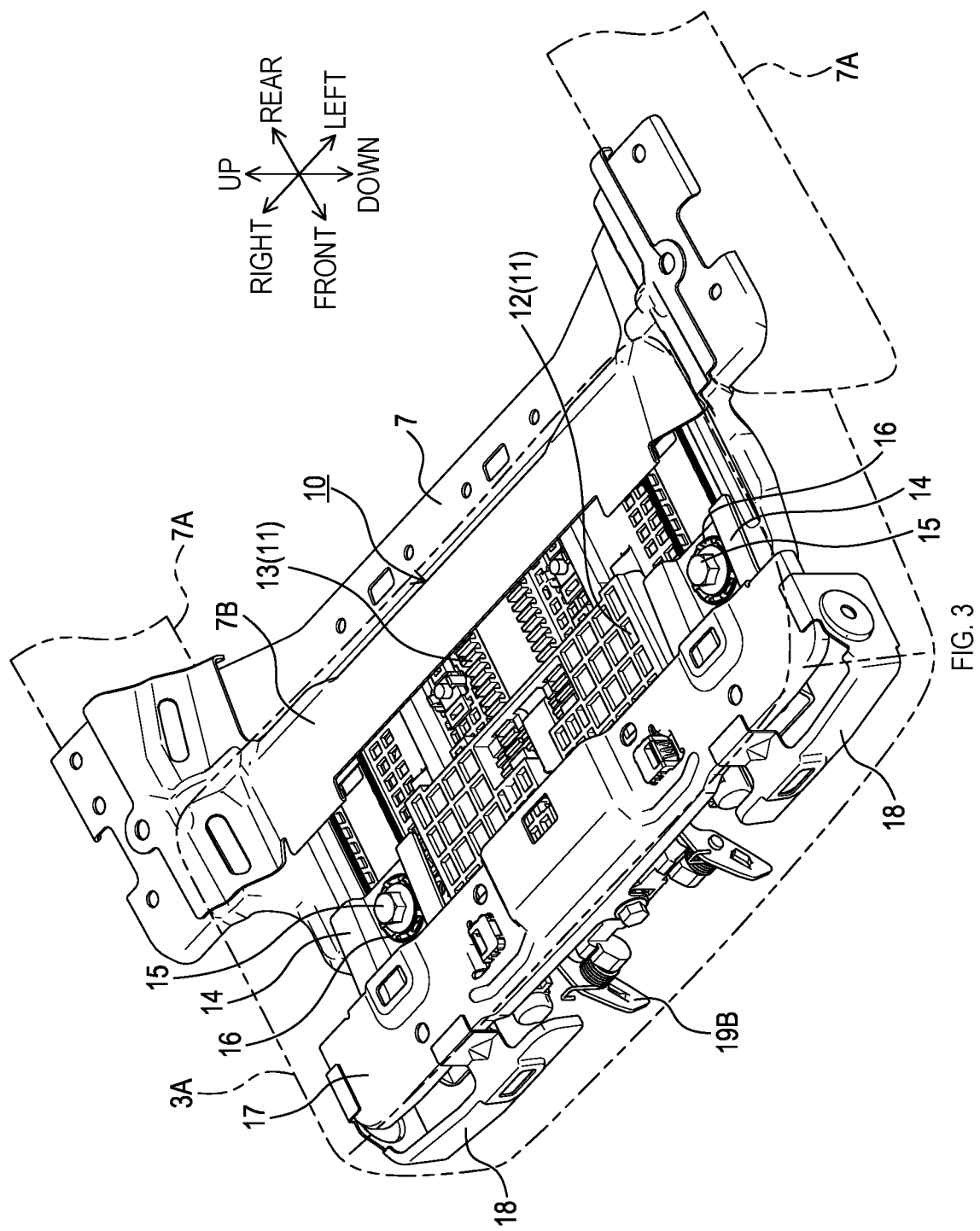
FIG. 3 is a diagram showing the cushion length varying device according to the first embodiment, where the cushion length is largest.

The movable portion 3A comprises a cushion length varying device 10 (see FIGS. 2 and 3), a cushion member such as a pad (not shown), and a surface cover member (not shown). As shown in FIGS. 2 and 3, the cushion length varying device 10 is mounted on a front panel 7 of metal.

The front panel 7 forms a part of a cushion frame. The cushion frame forms a frame of the seat cushion 3. The cushion frame comprises two side frames 7A and the front panel 7.

The two side frames 7A are of metal, and extend in the seat front-rear directions in a state of each being arranged on a seat-width-direction first end side and on a seat-width-direction second end side. The front panel 7 has a panel-like shape, and extends in the seat-width directions so as to couple the side frames 7A to each other at their front-end sides.

<2. Cushion Length Varying Device>
<2.1 Overview of Cushion Length Varying Device>

Figure 4:
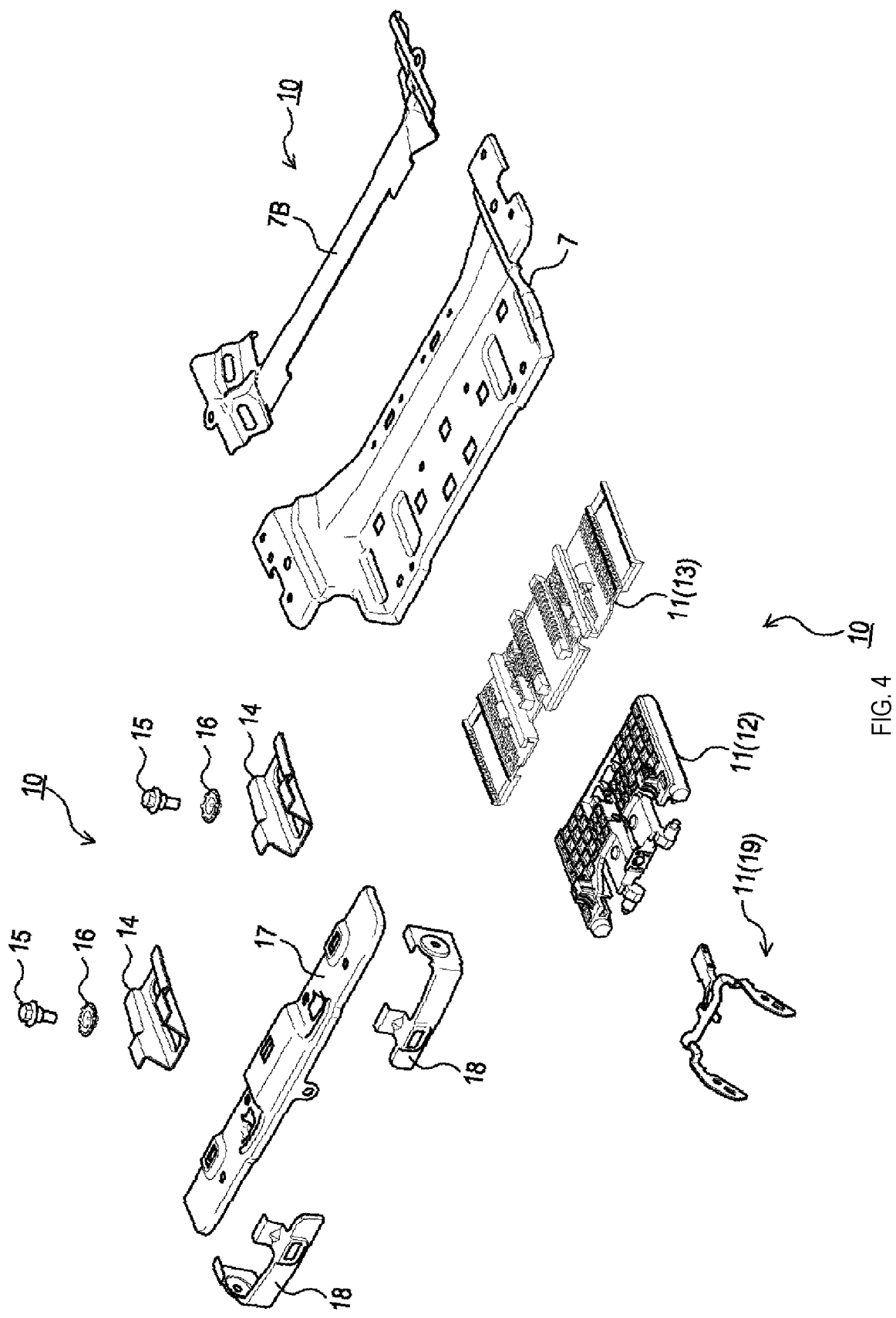
FIG. 4 is an exploded perspective view of the cushion length varying device according to the first embodiment.

As shown in FIG. 4, the cushion length varying device 10 comprises a sliding device 11, two brackets 14, two bolts 15 (same number as the brackets 14), two spacers 16 (same number as the bolts 15), a movable panel 17, two side panels 18, and a receiving bracket 7B.

As shown in FIG. 3, the two brackets 14 are each arranged on a seat-width-direction first end side and on a seat-width-direction second end side, and the two side panels 18 are also each arranged on the seat-width-direction first end side and on the seat-width-direction second end side.

The movable panel 17 and the two side panels 18 form a shell structure defining the shape of a front-end side of the movable portion 3A. The cushion member and the surface cover member are arranged on a surface of the movable panel 17 and the two side panels 18.

The receiving bracket 7B is fixed to the front panel 7 to transmit a downward load acting on the seat cushion 3 to the front panel 7. The cushion member and the surface cover member are arranged on an upper surface of the receiving bracket 7B. The movable panel 17, the two side panels 18, and the receiving bracket 7B are of metal.

<2.2 Sliding Device>

Figure 5:
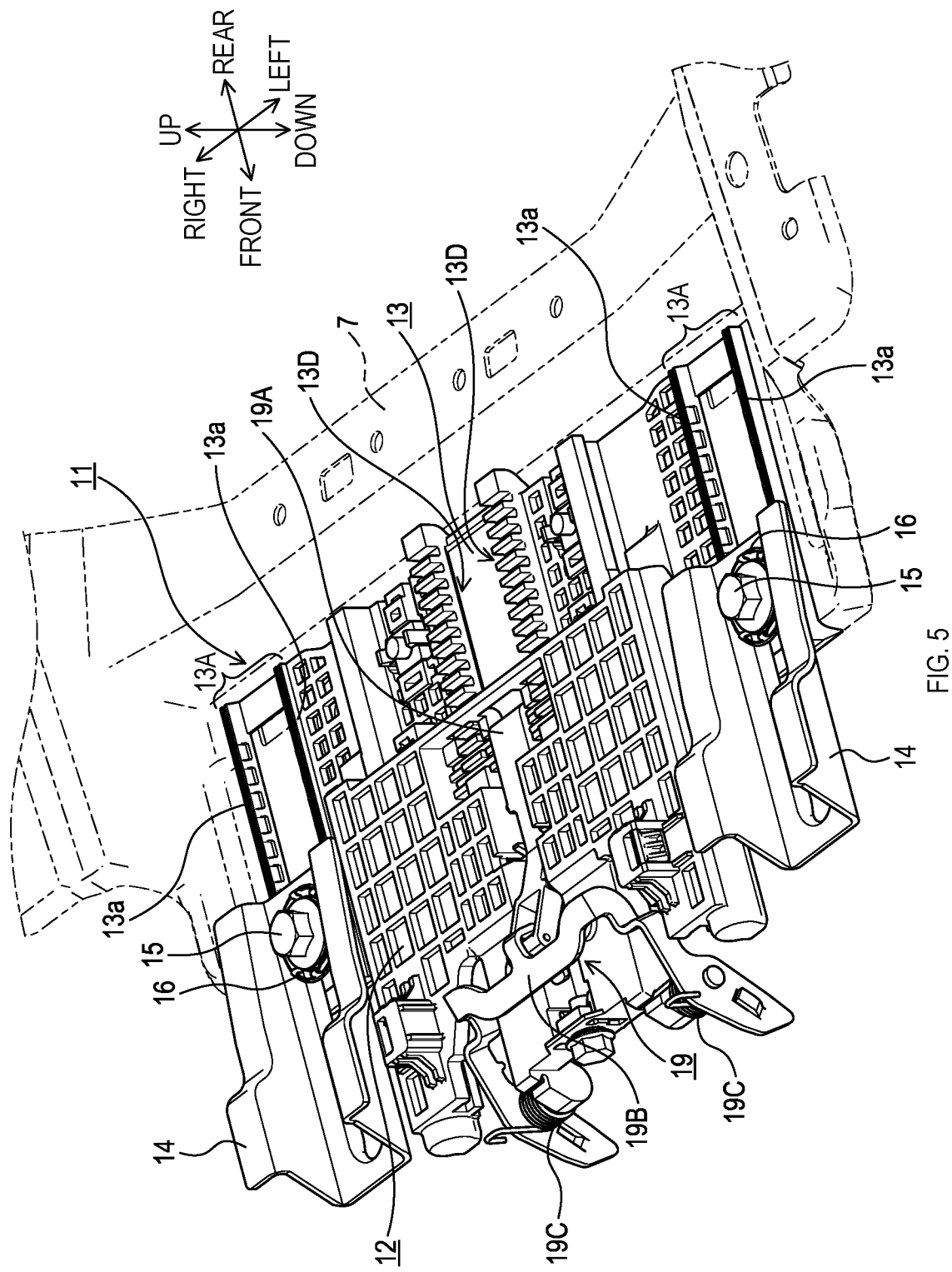
FIG. 5 is a diagram showing a configuration of a part of the cushion length varying device according to the first embodiment.

The sliding device 11 is a mechanism for allowing the movable portion 3A to be displaceable in the seat front-rear directions. As shown in FIGS. 4 and 5, the sliding device 11 comprises a sliding member 12, a base member 13, and a lock mechanism 19.

[Base Member and Sliding Member]

Figure 6:
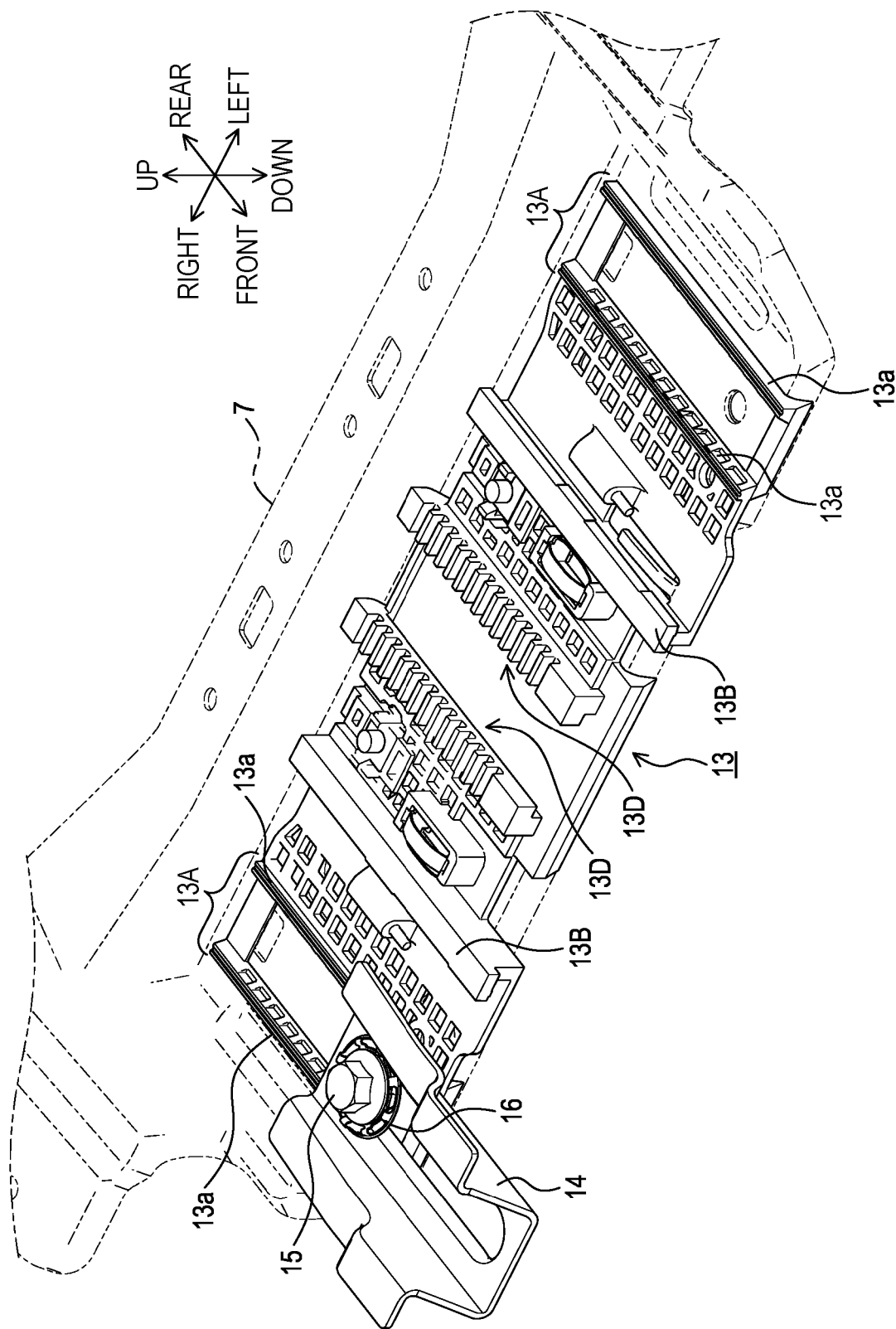
FIG. 6 is a diagram showing a configuration of a part of the cushion length varying device according to the first embodiment.

The base member 13 is made of resin, and is fixed to the front panel 7 as shown in FIG. 6. The base member 13 comprises support portions 13A and rail portions 13B.

The number of the support portions 13A and the number of the rail portions 13B are the same as the number of the two brackets 14. The base member 13 is a one-piece member formed of resin, with the two support portions 13A and the two rail portions 13B integrated thereon. The two support portions 13A each comprise two support members 13a.

The two support portions 13A each support a corresponding one of the two brackets 14 in a manner slidably contactable with the corresponding one of the two brackets 14. The two rail portions 13B extend in the seat front-rear directions, and support the sliding member 12 while in contact with the sliding member 12 in a slidably contactable manner.

Figure 7:
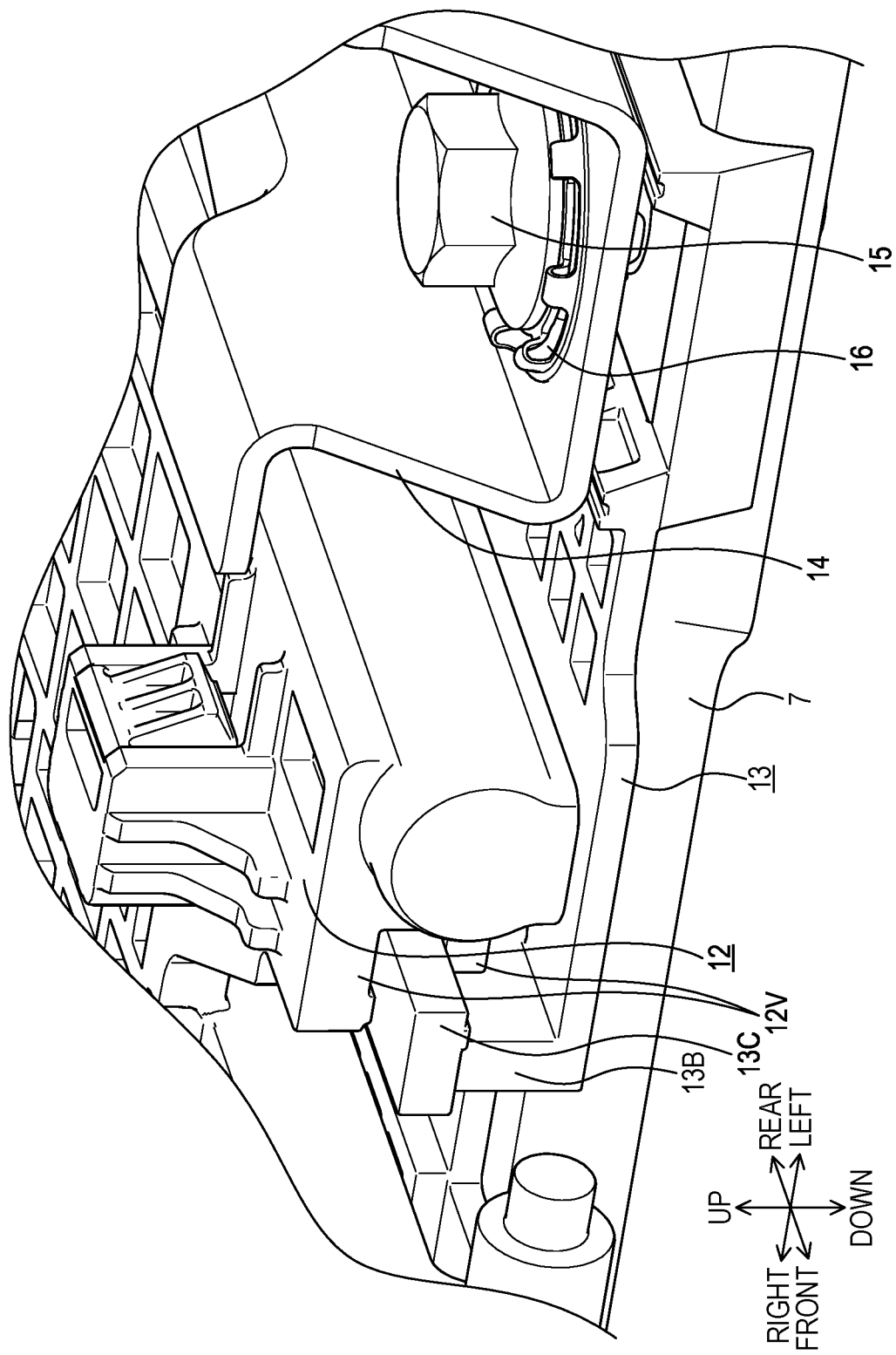
FIG. 7 is a diagram showing a configuration of a part of the cushion length varying device according to the first embodiment.
Figure 8:
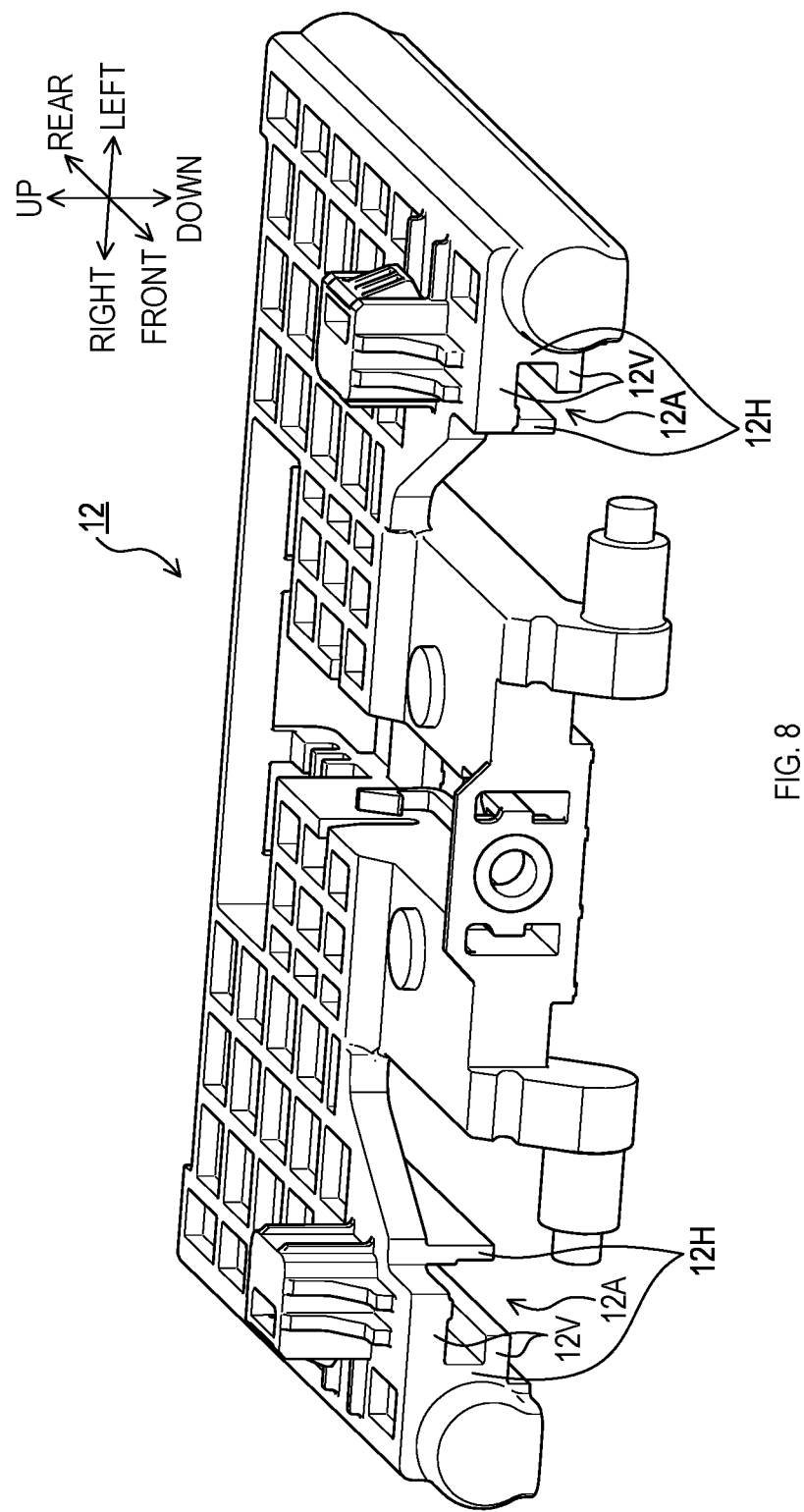
FIG. 8 is a diagram showing a sliding member according to the first embodiment.

As shown in FIGS. 6 and 7, the two rail portions 13B are each formed such that a cross-sectional shape thereof perpendicular to its extending direction is substantially L shape. As shown in FIG. 8, the sliding member 12 comprises two fitting groove portions 12A.

The two fitting groove portions 12A are each fitted to a corresponding one of the two rail portions 13B in a slidably contactable manner. Specifically, as shown in FIGS. 7 and 8, the two fitting groove portions 12A each have two walls 12V, between which a horizontal portion 13C (see FIG. 7) of the corresponding one of the two rail portions 13B is held from both sides in up-down directions, and two walls 12H, between which the horizontal portion 13C is held from both sides in the seat-width directions.

The sliding member 12 is a resin member, and is displaceable relative to the front panel 7 in the seat front-rear directions, that is, in an extending direction of the two rail portions 13B. The movable panel 17 is fixed to the sliding member 12. The two side panels 18 are fixed to the movable panel 17.

[Lock Mechanism]

The lock mechanism 19 is a mechanism for switching between a case in which the sliding member 12 is made slidable and a case in which the sliding member 12 is made non-slidable, relative to the base member 13, that is, relative to the front panel 7.

As shown in FIG. 5, the lock mechanism 19 comprises a lock lever 19A, an operation portion 19B, two retention springs 19C, and an assist spring (not shown). The assist spring exerts an elastic force to move the sliding member 12 toward a seat-front side.

The lock lever 19A is displaceable between a position where it is engaged with recessed portions 13D (see FIG. 6) provided to the base member 13 (hereinafter referred to as an engaged position) and a position where such engagement is released (hereinafter referred to as a released position).

The operation portion 19B is a portion that is operated by the occupant or other person and to which an operational force to displace the lock lever 19A is input. The two retention springs 19C are elastic bodies exerting an elastic force to retain the lock lever 19A in the engaged position.

When the operational force is input to the operation portion 19B, the position of the lock lever 19A becomes the released position, and a biasing force of the assist spring displaces the movable portion 3A toward the seat-front side. Then, when the operational force ceases, the position of the lock lever 19A becomes the engaged position. This results in fixing the position of the movable portion 3A.

<2.3 Bracket>

The two brackets 14 are of metal and, as shown in FIG. 5, coupled to the front panel 7 in a manner displaceable relative to the front panel 7 in the seat front-rear directions. The two brackets 14 are displaced integrally with the sliding member 12, and transmit a load acting on the movable portion 3A to the front panel 7.

Figure 9:
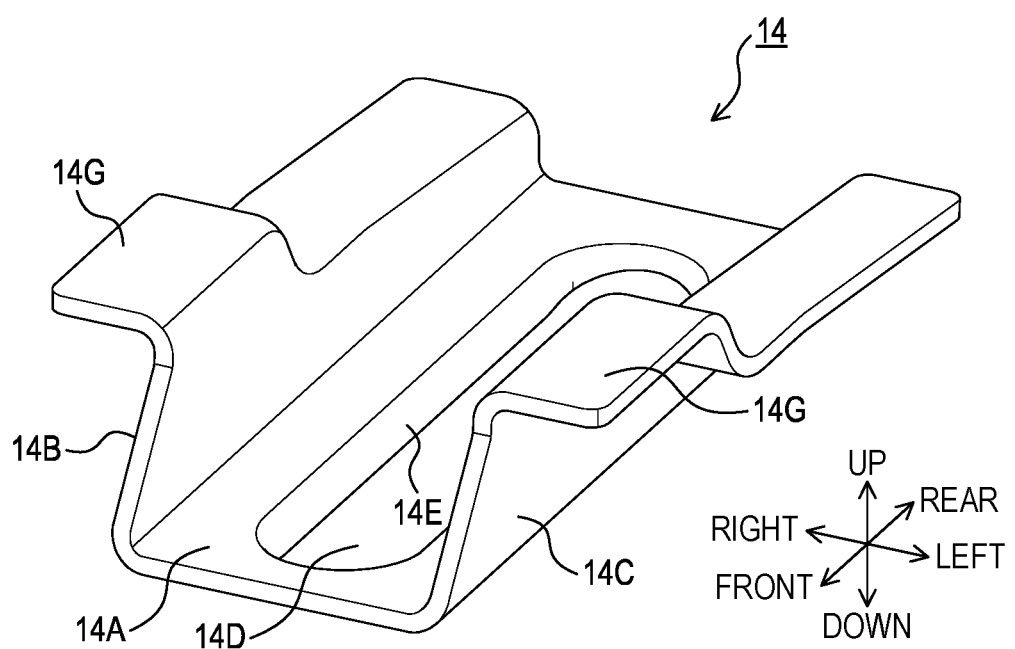
FIG. 9 is a diagram showing a bracket according to the first embodiment.

As shown in FIG. 9, each of the two brackets 14 comprises a base-plate portion 14A and two standing portions 14B and 14C. The base-plate portion 14A faces the front panel 7 indirectly. The base-plate portion 14A contains a through hole 14D having an ellipse-like shape.

The major axis direction of the through hole 14D corresponds to a displacement direction of the bracket 14, that is, the seat front-rear directions. The bolt 15 passes through the through hole 14D, and is fixed to the front panel 7 (see FIG. 10).

Figure 10:
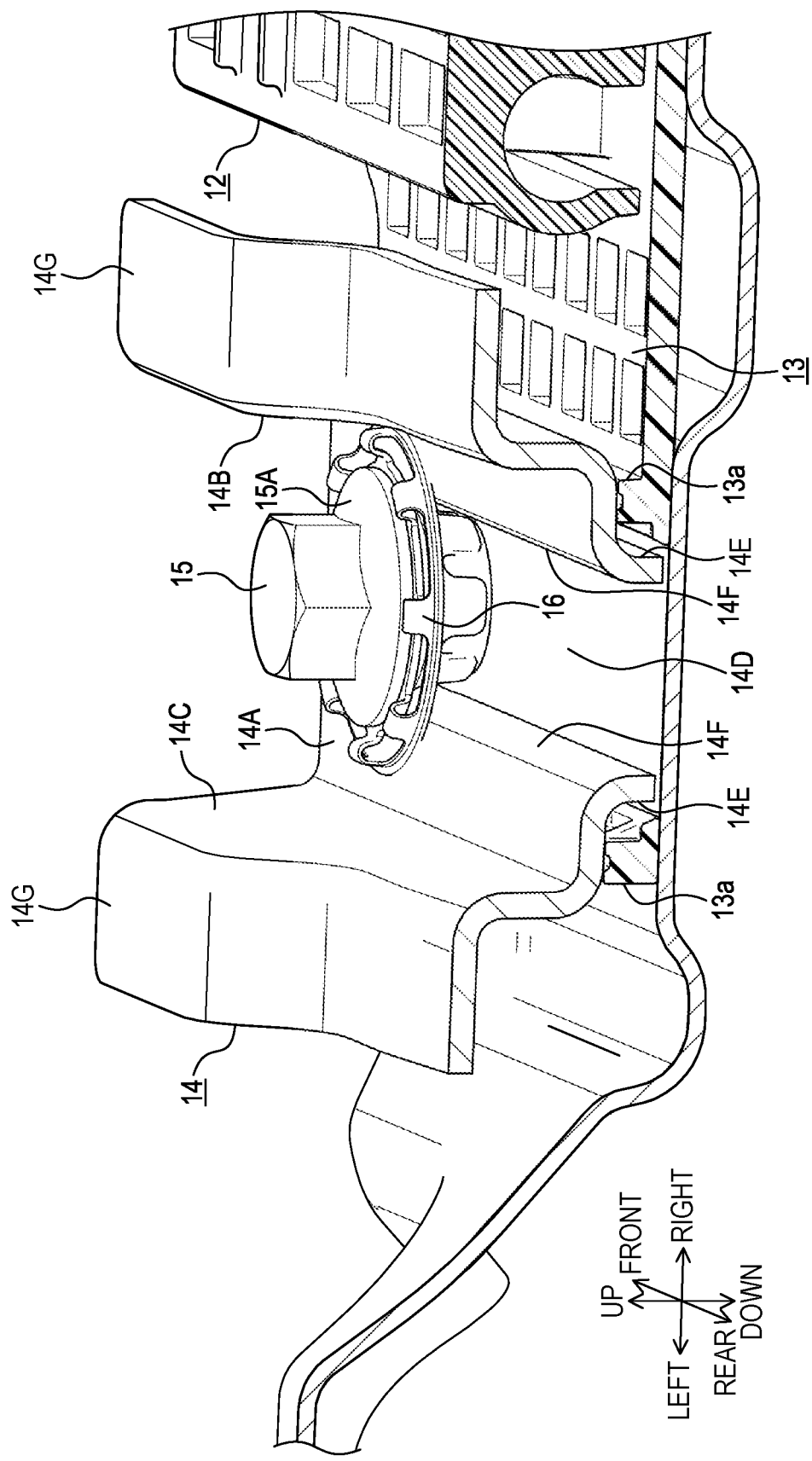
FIG. 10 is a diagram showing a configuration of a part of the cushion length varying device according to the first embodiment.

Further, as shown in FIG. 10, a burring portion 14E is provided at least to a portion 14F parallel to the major axis direction in the outer circumference of the through hole 14D. The burring portion 14E has a ridge-like shape extending from the outer circumference toward the front panel 7.

Figure 11:
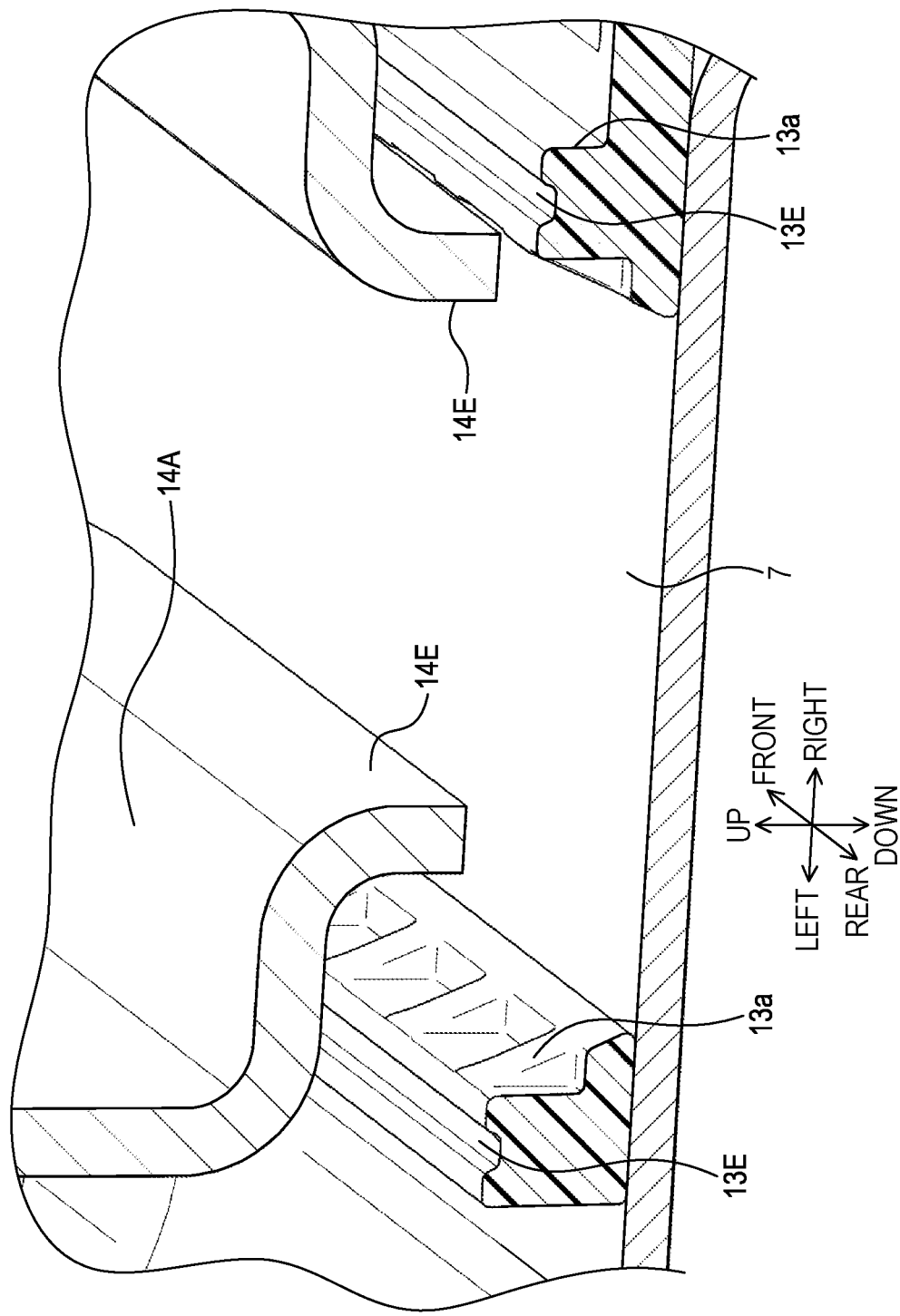
FIG. 11 is a diagram showing a configuration of a part of the cushion length varying device according to the first embodiment.

The burring portion 14E is integrally formed with the base-plate portion 14A by burring. As shown in FIG. 11, an extending-direction end of the burring portion 14E is spaced apart from the front panel 7 via a clearance.

A bottom surface of the base-plate portion 14A, that is, a surface of the base-plate portion 14A facing the front panel 7, contacts the support members 13a in a slidably contactable manner. The two brackets 14 each contact the corresponding support portion 13A (more specifically, the corresponding support members 13a).

Each support member 13a is a ridge-like portion extending in the displacement direction of the bracket 14. Each support member 13a includes a groove 13E on a portion directly facing the corresponding bracket 14. The grooves 13E extend parallel to the displacement direction of the corresponding bracket 14.

Figure 12:
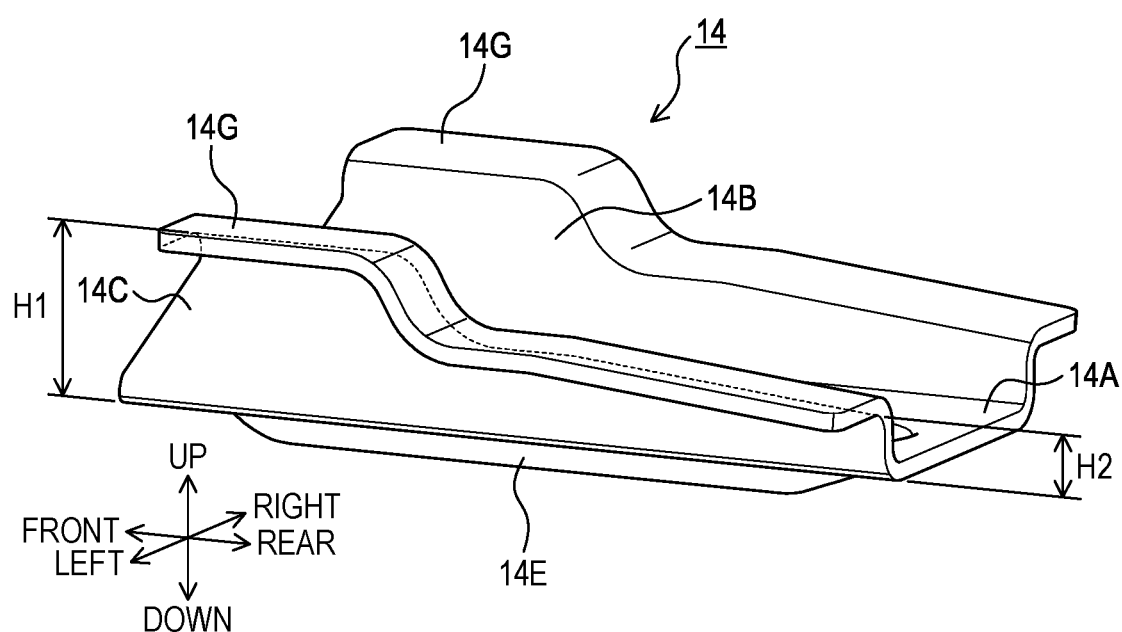
FIG. 12 is a diagram showing the bracket according to the first embodiment.

As shown in FIG. 9, the standing portions 14B and 14C form walls substantially parallel to a vertical direction. In other words, the standing portions 14B and 14C form walls substantially perpendicular to the base-plate portion 14A. A vertical dimension H1 (see FIG. 12) on a front-end side of each of the standing portions 14B and 14C is larger than a vertical dimension H2 (see FIG. 12) on a rear-end side of each of the standing portions 14B and 14C.

The standing portion 14B is arranged on a seat-width-direction first end side of the base-plate portion 14A. The standing portion 14C is arranged on a seat-width-direction second end side of the base-plate portion 14A. Thus, the shape of the end of each bracket 14 in the seat front-rear directions is substantially U-shape. The shape of the end of each bracket 14 in the seat front-rear directions may be substantially L-shape.

An upper end of each of the standing portions 14B and 14C is provided with a flange 14G extending in the horizontal direction. A bottom surface of the movable panel 17 is fixed to an upper surface of the flange 14G by welding. Thus, the sliding member 12, the two brackets 14, and the movable panel 17 are displaced integrally in the seat front-rear directions.

Figure 13:
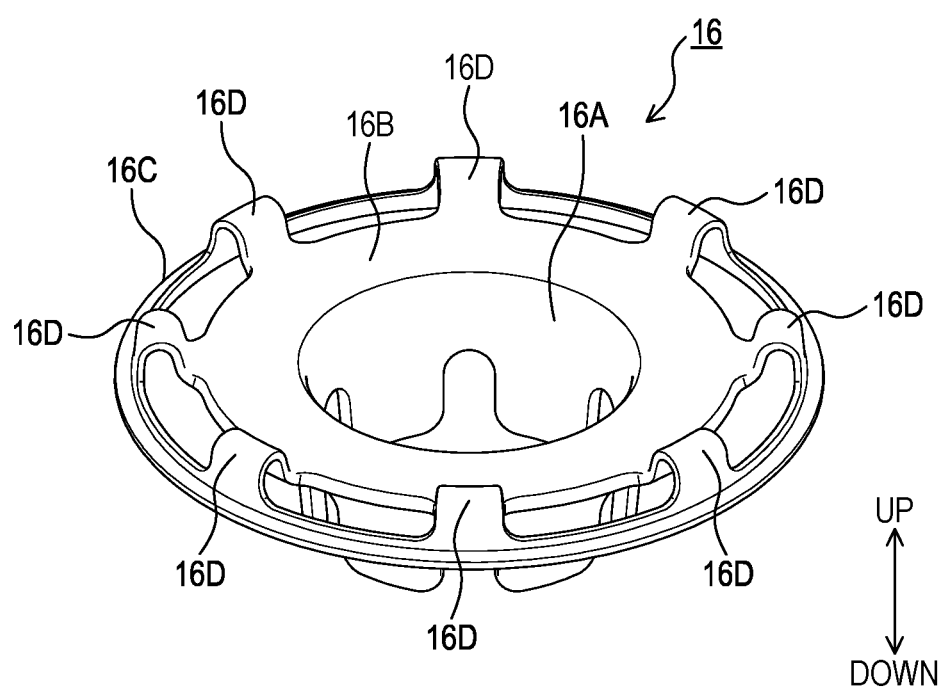
FIG. 13 is a diagram showing a spacer according to the first embodiment.

As shown in FIG. 10, the spacer 16 is arranged between a head portion 15A of the bolt 15 and the base-plate portion 14A. The spacer 16 is made of resin. As shown in FIG. 13, the spacer 16 comprises a cylindrical portion 16A, a flange 16B, a ring portion 16C, and coupling portions 16D.

The cylindrical portion 16A is a substantially cylindrical portion surrounding an underhead portion of the bolt 15. The flange 16B is a brim-like portion extending from an upper end of the cylindrical portion 16A in the substantially horizontal direction. The ring portion 16C is an annular portion surrounding an outer edge of the flange 16B.

The coupling portions 16D are curved portions coupling the ring portion 16C and the outer edge of the flange 16B to each other. The cylindrical portion 16A, the flange 16B, the ring portion 16C, and the coupling portions 16D are integrally formed of resin.

<2.4 Operation of Cushion Length Varying Device>

When an operational force is input to the operation portion 19B, the position of the lock lever 19A becomes the released position, and the biasing force of the assist spring displaces the movable portion 3A toward the seat-front side. This causes the brackets 14 to be displaced by sliding toward the seat-front side integrally with the sliding member 12 via the movable panel 17.

At this time, each bracket 14 is displaced while the underhead portion of the bolt 15 (more specifically, the cylindrical portion 16A) is in sliding contact with the portion 14F parallel to the major axis direction in the outer circumference of the through hole 14D (more specifically, with the burring portion 14E).

When the operational force applied to the operation portion 19B ceases, the position of the lock lever 19A becomes the engaged position, and displacement of the movable portion 3A is restricted. When the movable portion 3A is to be displaced toward the seat rear side, the occupant needs to press the movable portion 3A toward the seat rear side with a force exceeding the biasing force of the assist spring, in the state where the position of the lock lever 19A is kept to the released position.

<3. Features of Vehicle Seat (Especially, Cushion Length Varying Device) According to the Present Embodiment>

In the vehicle seat 1 according to the present embodiment, the load acting on the movable portion 3A is received by the two brackets 14 of metal, and the received load is transmitted to the front panel 7 of metal. This enables the vehicle seat 1 to receive a larger load than in the invention disclosed in Patent Document 1 (i.e., than in the invention in which members corresponding to the brackets 14 and/or a member corresponding to the front panel 7 are made of resin).

In each bracket 14, the vertical dimension H1 on the front-end side of each of the standing portions 14B and 14C is larger than the vertical dimension H2 on the rear-end side of each of the standing portions 14B and 14C.

This results in inhibiting each bracket 14 from interfering with the receiving bracket 7B when the cushion length is shortened, that is, when the rear-end side of each bracket 14 is positioned under the receiving bracket 7B and the bracket 14 is retracted (see FIG. 2).

Further, in the vehicle seat 1, such interference between each bracket 14 and the receiving bracket 7B can be avoided while securing the geometrical moment of inertia of each bracket 14 required against a vertical load.

The burring portion 14E extending toward the front panel 7 is provided at least to the portion 14F parallel to the major axis direction in the outer circumference of the through hole 14D in each bracket 14. This results in increasing the geometrical moment of inertia of the bracket 14 against a vertical load, thus increasing the flexural rigidity of each bracket 14.

The support portion 13A of resin fixed to the front panel 7 is arranged between each bracket 14 and the front panel 7, and the groove 13E extending in the displacement direction of the bracket 14 is arranged on a portion of the support portion 13A directly facing the corresponding bracket 14 (more specifically, on a portion of the support member 13a of the support portion 13A directly facing the corresponding bracket 14).

This can inhibit a larger contact area between each bracket 14 and the corresponding support portion 13A, thus inhibiting a larger sliding resistance between each bracket 14 and the corresponding support portions 13A.

Moreover, the spacer 16 of resin is arranged between the head portion 15A of the bolt 15 and the bracket 14. This can inhibit a larger sliding resistance between the bracket 14 and the bolt 15.

Other Embodiments

The cushion length varying device according to the above-described embodiment is of a type manually operated. However, the present disclosure is not limited to this. The present disclosure may have a configuration in which, for example, the movable portion 3A is displaced by an actuator, such as an electric motor.

The bracket 14 according to the above-described embodiment has a cross section of a substantially U-shape. However, the present disclosure is not limited to this. In the present disclosure, the bracket 14 having a cross section of, for example, a substantially L-shape may be employed.

The sliding member 12 and the base member 13 according to the above-described embodiment are made of resin. However, the present disclosure is not limited to this. In the present disclosure, for example, at least one of the sliding member 12 or the base member 13 may be made of metal, or of resin to which metal is integrated by insert molding.

In the above-described embodiment, the sliding member 12 and the bracket 14 are separate members. However, the present disclosure is not limited to this. The present disclosure may have a configuration in which, for example, the bracket 14 is integrated with the sliding member 12 by insert molding.

The bracket 14 according to the above-described embodiment is provided with the burring portion. 14E. However, the present disclosure is not limited to this. In the present disclosure, for example, the bracket 14 with the burring portion 14E omitted may be employed.

The bracket 14 according to the above-described embodiment is configured such that the vertical dimension H1 is larger than the vertical dimension H2. However, the present disclosure is not limited to this. The present disclosure may have a configuration in which, for example, the vertical dimension H1 is equal to the vertical dimension H2, or in which the vertical dimension H1 is smaller than the vertical dimension H2.

In the above-described embodiments, examples of the vehicle seat for a car are described. However, the present disclosure is not limited to them. The present disclosure may also be applied to, for example, a seat used in vehicles such as railroad vehicles, ships, or aircraft, and to a stationary seat used in theaters, at home, or in other places.

Moreover, the present disclosure only needs to be consistent with the spirit of the disclosure described in the above-described embodiments, and is not limited to the above-described embodiments. The present disclosure may take a configuration in which at least two embodiments among the above-described embodiments are combined together, or a configuration in which any of the diagrammatically-shown constituent elements or the constituent elements described with reference numerals are omitted in the above-described embodiments.

What is claimed is:

1. A vehicle seat including a movable portion at a front-end side of a seat cushion and having a variable cushion length, the vehicle seat comprising:
   a front panel of metal arranged on the front-end side of the seat cushion to form a frame of the seat cushion;
   a sliding device allowing the movable portion to be displaceable, the sliding device including a sliding member displaceable relative to the front panel in seat front-rear directions; and
   a bracket of metal that is coupled to the front panel in a manner displaceable relative to the front panel in the seat front-rear directions and that is displaced integrally with the sliding member, the bracket transmitting a load acting on the movable portion to the front panel.

2. The vehicle seat according to claim 1,
   wherein a shape of an end of the bracket in the seat front-rear directions is substantially U-shape or substantially L-shape.

3. The vehicle seat according to claim 2,
   wherein the bracket includes a standing portion substantially parallel to a vertical direction, and
   wherein a vertical dimension of the standing portion on a front-end side thereof is larger than a vertical dimension of the standing portion on a rear-end side thereof.

4. The vehicle seat according to claim 2,
   wherein a portion of the bracket facing the front panel contains a through hole having an ellipse-like shape extending in a displacement direction of the bracket, and a bolt passing through the through hole is fixed to the front panel, and
   wherein a burring portion extending toward the front panel is provided at least to a portion parallel to a major axis direction of the through hole in an outer circumference of the through hole.

5. The vehicle seat according to claim 4,
   wherein a spacer of resin is arranged between a head portion of the bolt and the bracket.

6. The vehicle seat according to claim 1,
   wherein a support portion of resin fixed to the front panel is arranged between the bracket and the front panel, the support portion being slidably contactable with the bracket, and
   wherein a portion of the support portion directly facing the bracket includes a groove extending in the displacement direction of the bracket.

\* \* \* \* \*